United States Patent [19]

Sandau

[11] 4,303,197
[45] Dec. 1, 1981

[54] CONTROL VALVE

[75] Inventor: Hartmut Sandau, Möglingen, Fed. Rep. of Germany

[73] Assignee: Robert Bosch GmbH, Stuttgart, Fed. Rep. of Germany

[21] Appl. No.: 175,182

[22] Filed: Jul. 31, 1980

[30] Foreign Application Priority Data

Feb. 20, 1980 [DE] Fed. Rep. of Germany ....... 3006370

[51] Int. Cl.$^3$ .............................................. G05D 27/00
[52] U.S. Cl. .............................. 236/92 R; 236/93 R; 236/99 J; 137/73; 137/468; 137/491
[58] Field of Search ............ 236/DIG. 5, 92 R, 93 R, 236/93 A, 99 R, 99 A, 99 J; 137/72, 73, 468, 491

[56] References Cited

U.S. PATENT DOCUMENTS

| | | | |
|---|---|---|---|
| 1,848,031 | 3/1932 | Spencer | 137/468 X |
| 2,401,144 | 5/1946 | Dube | 236/92 R |
| 2,820,473 | 1/1958 | Reiners | 236/92 R X |
| 3,401,605 | 9/1968 | Born | 137/491 X |
| 3,498,537 | 3/1970 | Wong | 137/73 X |

Primary Examiner—Harold W. Weakley
Attorney, Agent, or Firm—Michael J. Striker

[57] ABSTRACT

The control valve for keeping constant viscosity and temperature of a pressure medium in a hydraulic circuit includes a preliminary control valve which supports a temperature sensitive control element and adjustable throttling means including a throttling plunger controlled by the control element; a control slider arranged in the valve upstream of the preliminary control valve is provided with first throttling means for admitting pressure medium against the preliminary control valve to establish a bypass connection in addition to the main connection controlled by the slider; to avoid excessive temperature increase of the medium in the case of a damage of the control element, a temperature sensitive shearing pin is provided between the control element and the throttling plunger to cause an override of the plunger to a position in which an additional bypass connection is established which prevents throttling and thus temperature increase of the pressure medium.

4 Claims, 1 Drawing Figure

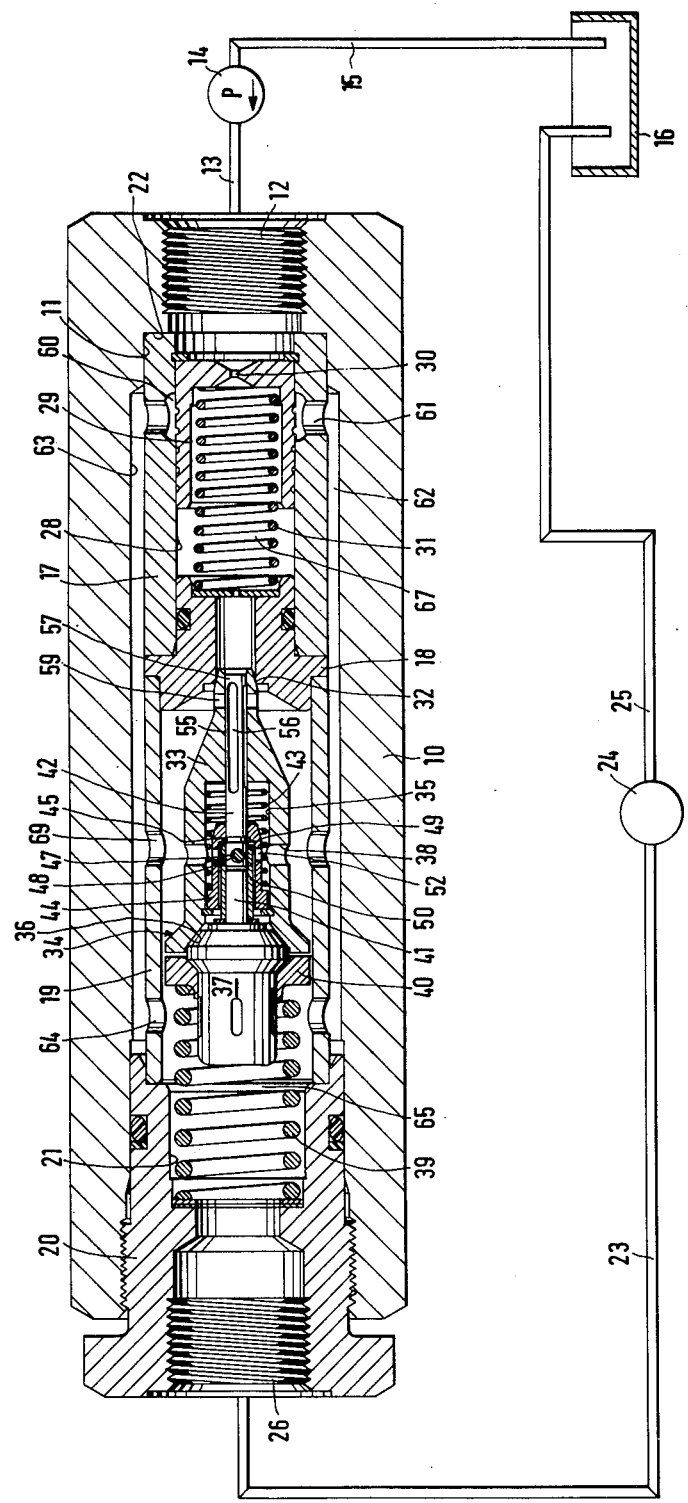

CONTROL VALVE

BACKGROUND OF THE INVENTION

The present invention relates in general to control valves and in particular to a control valve for keeping constant viscosity and temperature of a pressure medium in a hydraulic circuit by means of throttling the medium on a control slider and by controlling the throttling effect by means of a temperature sensitive control element which is arranged in a preliminary control valve including additional throttling passage controlled by the control element.

The control valve of this type is known for example from the copending patent application corresponding to the German patent application No. P 29 32 481.0. In this known control valve the temperature sensitive control element including a substance expanding or contracting in response to temperature changes controls a throttling passage in the preliminary control valve which in turn regulates the flow in the valve body. In the event of a malfunction of the temperature sensitive control element for example due to an accidental escape of the temperature feeling substance, the control valve can no longer perform its function that means the temperature of the pressure medium may attain excessively high values which in turn may cause damage in the whole hydraulic circuit.

SUMMARY OF THE INVENTION

A general object of the present invention is to overcome the aforementioned disadvantages.

More specifically, an object of the invention is to provide an improved control valve of the aforedescribed type which prevents the overheating of the pressure medium even in the case when the temperature sensitive element is disabled.

In keeping with this object, and others which will become apparent hereafter, one feature of the invention resides in the provision of a valve housing defining an inlet and an outlet, a control slider arranged for a reciprocating movement in the housing, first throttling means provided in the slider, a preliminary control valve arranged in the housing downstream of the slider and including the temperature sensitive control element, adjustable throttling means formed between the first throttling means and the outlet, the adjustable throttling means being controlled by the control element in response to the temperature of the pressure medium and temperature sensitive safety means provided between the control element and the adjustable throttling means to establish a bypass channel in the adjustable throttling means when the temperature of the pressure medium exceeds a predetermined limit.

In the preferred embodiment of this invention, the safety means includes a spacer sleeve arranged between the control element and a plunger of the adjustable throttling means, a shearing pin passing through the spacer sleeve and through the plunger to keep the same at a distance from the control element whereby the spacer sleeve transmits the movement of the control elements to the plunger, and a bypass channel normally closed by the plunger when the shearing pin is intact but opened by the plunger when the shearing pin is cut off due to the excessive temperature of the pressure medium.

In the preferred embodiment of this invention, the shearing pin is made of a temperature sensitive plastic material inserted in aligned holes formed in the spacer sleeve and in the plunger of the adjustable throttling means; the piston of the control element, the safety device, the plunger and the throttling bore of the adjustable throttling means are coaxially arranged in a blind bore of the poppet of the preliminary control valve.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE illustrates an axial cross-section of the control valve of this invention in connection with a schematically indicated hydraulic circuit.

DESCRIPTION OF THE PREFERRED EMBODIMENT

The control valve of this invention includes a housing 10 formed with a throughgoing longitudinal bore 11 one opening of which forms an inlet 12 of the valve. A conduit 13 connects the inlet 12 to the pressure side of a pump 14 which delivers a pressure medium sucked in via a suction conduit 15 from a tank 16. In the bore 11, there are consecutively arranged in contact with each other a control sleeve 17, a seat body 18 of preliminary control valve, a spacer sleeve 19 and a hollow screw 20 which compresses the entire tubular assembly of the parts 17 through 19 against a shoulder 22 formed at the inlet end of the housing 10. The hollow screw 20 is formed with a center bore 21 communicating with an outlet 26 of the control valve. The outlet 26 is connected via a conduit 23 to a hydraulic consumer 24 such as for instance a shaft lubricating device; a return conduit 25 returns the used pressure medium from the consumer 24 into the tank 16. For a proper operation of the lubricating device 24, it is essential that the pressure medium delivered by the conduit 23 has always constant viscosity and temperature.

In the bore 28 of the control sleeve 17, control slider 29 is arranged for a reciprocating movement and is in tightly sealing contact with the inner wall of the sleeve 17. The control slider 29 has a cup-shaped configuration with its bottom side facing the inlet 12 being provided with a central throttling opening 30. The open side of the control slider 29 accommodates a biasing spring 31 which rests on the seat body 18 and urges the slider 29 against the shoulder 22 and the inlet end of the longitudinal bore 11. The seat body 18 is formed with a central passage defining at its downstream end a valve seat 32 closable by a poppet 33 of the preliminary control valve 34. The poppet 33 has a cylindrical portion formed with a blind bore 35 and a conical closing portion formed with an axial throttling passage 55 in which a throttling pin 56 is guided for a reciprocating movement. Approximately midway in the cylindrical part of the poppet 33 there are formed transverse passages 38 connecting the blind bore 35 with the annular space 62 in the housing 10. The open end of the blind bore 35 in the poppet 33 is formed with a shoulder 36 which accommodates a temperature sensitive control element 37 including a substance which is extendable or retractable in response to the temperature changes of the pressure medium, and control a plunger 41 which axially projects into the blind bore 35. A helical spring 39 resting at one end on a step formed in the bore 21 in the hollow screw 20 and at the other end on a retaining plate 40 mounted on the control element 37 biases the control element against poppet 33 and thus the conical portion of the poppet into its closing position in contact with the seat 32.

The piston 41 of the temperature sensitive control element 37 is positively coupled to the aforementioned throttling plunger 42. The positive coupling is made by a pressure spring 43 resting at one end on the bottom of the blind bore 35 and pressing at the other end thereof against a bottom flange of a cup-shaped body 44 which is connected to the throttling plunger 42 by means of a snap ring 45. The portion of the throttling plunger 42 projecting into the cup-shaped body 44 is slidably engaged by a spacer sleeve 49. An additional spacer sleeve 50 is arranged around the piston 41 between the first spacer sleeve 49 and the body of the control element 37. The cup-shaped body 44 is formed with a plurality of radially directed passages 52. As mentioned before, the throttling passage 55 in the conical closing part of the poppet 33 is axially aligned with the plunger 41 and with the center of the valve seat 32 so that the throttling plunger is at one end attacked by the pressure medium passing through the throttling opening 30 in the control slider and at the other end by the piston 41 of the control element 37. The part of the throttling plunger 42 which extends in the throttling bore 55 in the conical end part of the poppet 33 is formed with elongated and axially directed grooves 56 reaching short of the end face of the plunger so that a full size control collar 57 is left at the inlet region of the throttling passage 55. The closing tip of the poppet 33 immediately downstream of the control collar 57 of the throttling plunger 42 is provided with a plurality of transverse passages 59 connecting the throttling passage 55 with the interior of the spacer sleeve 19 and the elongated annular space 52. The center bore 28 of the control sleeve 17 is extended in the region near to the shoulder 22 into an annular groove 60 which communicates via a plurality of transverse passages 61 with the elongated annular space 62 resulting between the outer surface of the tubular assembly 17 through 19 and extended intermediate part 63 of the center bore 11 in the housing 10. Similar transverse passages 64 and 69 are formed in the spacer sleeve 19 thus connecting the interior of the spacer sleeve via the longitudinal annular space 62 and the spring chamber 65 in which the temperature sensitive control element 37 is located, with the outlet port 26. The variable space between the control slider 29 and the seat body 18 is indicated by reference numeral 67.

The operation of the control valve is as follows:

Pressure fluid delivered by the pump 14 attacks through the inlet opening 12 the end face of the control slider 29 and flows through the throttling opening 30 into the space 67 where it attacks the poppet 33 resting on the seat 32. At the beginning of the operation of the control valve, the pressure fluid is cold, the piston 41 of the temperature sensitive control element 37 is retracted and consequently the control collar 57 of the throttling plunger 42 is also retracted and closes the inlet region of the throttling bore 55. With increasing pressure of the pressure medium poppet 33 is compressed against the force of the biasing spring 39 and lifted from its seat 32 whereby the pressure medium flowing through the throttling opening 30 starts flowing through the preliminary control valve 34 and the outlet 26 to the consumer device 24. Due to the pressure drop across the throttling opening 30 the slider 29 is now displaced against the force of its biasing spring 31 in the direction toward the preliminary control valve until a connection is established between the inlet 12 and the annular groove 60 in the control sleeve 17. Consequently, pressure medium now starts flowing through the transverse passages 61, the elongated annular space 62 and the other transverse passages 64 into the spring chamber 65 where it contacts the pressure sensitive control element 37. Upon reaching the desired maximum operating temperature the pressure medium causes the control element 37 to extend its piston 41 to the right whereby the throttling plunger 42 shifts its control collar 57 out of the throttling bore 55 whereby a throttling bypass connection is established, that means the pressure medium flows apart from the aforedescribed flow path 61, 62 and 64 through the elongated grooves 56 into the interior of the puppet 33 and therefrom into the chamber 65. With increasing temperature of the pressure medium, pressure gradient across the preliminary throttle valve is reduced until the biasing spring 39 returns again the poppet 33 against its seat 32; the piston 41 of the control element 37 however, continues its expanding movement to the right and pushes still further the control collar 57 of the throttling plunger 42 away from the inlet opening of the throttling valve 45. As a result, the bypass channel keeps opening until the temperature of the pressure medium is stabilized. Pressure drop between the inlet 12 and the outlet 26 therefore is dependent on the magnitude of the bypass opening between the control collar 57 and the throttling bore 55 which in turn is controlled in response to the temperature of the pressure medium. If the temperature of the pressure medium drops, the throttling opening 55 is again reduced by the control collar 57 and resulting throttling effect increases the temperature of the pressure medium to the desired value.

If it happens for any reason that the temperature sensitive control element 37 becomes defective for example due to the escape of the temperature sensing liquid, the throttling and the heating of the pressure medium would continue. If, however, the temperature of the medium exceeds a desired maximum value, for example by 20° or 30° C., the shearing pin 48 which is made of a plastic material quickly looses its rigidity and the pressure medium acting on the control collar 57 from the variable pressure space 67 causes the plunger 42 to shear off the pin 48 and to move against the retracted piston 41 of the control element 37. The biasing spring 43 keeps displacing the throttling plunger to the left to a point at which the control collar 57 overrides the transverse passages 59 in the poppet 33 thus establishing the connection between the space 67 and the annular space 62. In this manner a new bypass channel or a neutral flow between the spaces 67 and 65 is created which prevents an additional throttling and thus the temperature increase of the pressure medium.

As long as the temperature sensitive control element 37 is in working order, its control plunger 41 moves out to the right when the maximum working temperature is attained and thus no shearing force is applied against the sleeve 49 and the shearing pin 48. Accordingly, even if the in looses its rigidity due to an excessive temperature it will not be sheared off provided that the piston 41 counteracts the pressure exerted by the throttling plunger 42.

It will be understood that each of the elements described above, or two or more together, may also find a useful application in other types of constructions differing from the types described above.

While the invention has been illustrated and described as embodied in a specific example, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and is desired to be protected by Letters Patent is set forth in the appended claims:

1. A control valve for keeping constant viscosity and temperature of a pressure medium in a hydraulic circuit, comprising a valve housing defining an inlet and an outlet; a control slider arranged for reciprocating movement in said housing; throttling means provided on said slider; a preliminary control valve arranged in said housing downstream of said slider and including a temperature sensitive control element; adjustable throttling means formed between the first mentioned throttling means and said outlet, said adjustable throttling means being controlled by said control element in response to the temperature of the pressure medium; and temperature sensitive safety means provided between said control element and said adjustable throttling means to establish a bypass channel between said inlet and outlet when the temperature of the pressure medium exceeds a predetermined safety limit.

2. A control valve as defined in claim 1, wherein said preliminary control valve includes a stationary seat and a movable poppet urged against the seat by a biasing spring, said poppet being formed with a blind bore and said control element having a control piston projecting into said blind bore, and said adjustable throttling means including a throttling bore formed in said poppet in alignment with the center axis of said control piston, a throttling plunger slidably guided in said throttling bore and being spring biased against said control piston; and said safety means including a spacer sleeve arranged between said control piston and said throttling plunger, and a shearing pin connecting said spacer sleeve to said throttling plunger.

3. A control valve as defined in claim 2, wherein said shearing pin is made of a temperature sensitive plastic material which looses its rigidity when the temperature exceeds a predetermined safety limit.

4. A control valve as defined in claim 2, wherein said throttling plunger is connected to a spring retaining cup-shaped body engaging said biasing spring for said plunger, said cup-shaped body being arranged in said blind bore and surrounding said spacer sleeve and said shearing pin.

* * * * *